United States Patent

[11] 3,605,020

[72] Inventor William B. Sullivan, Jr. Columbus, Ohio
[21] Appl. No 59,971
[22] Filed July 31, 1970
[45] Patented Sept. 14, 1971
[73] Assignee The United States of America as represented by the Secretary of the Army

[54] SELECTIVE AUTOMATIC AUDIO THRESHOLD CIRCUIT
3 Claims, 2 Drawing Figs.

[52] U.S. Cl. ........................................................ 325/152, 325/164, 325/166
[51] Int. Cl......................................................... H04b 1/04
[50] Field of Search..... ................ 325/65, 141, 143, 152, 161, 164, 165

[56] References Cited

UNITED STATES PATENTS 3,169,221 2/1965 Franchi ..................... 325/152

*Primary Examiner*—Robert L Griffin
*Assistant Examiner*—Albert J. Mayer
*Attorneys*—Harry M. Saragovitz, Edward J. Kelly and Herbert Berl

ABSTRACT: This invention is an electronic system for keying radiophone transmitters in response to audio information and more particularly to a selective automatic audio threshold circuitry with the ability to adapt to environmental noise conditions.

PATENTED SEP 14 1971 3,605,020

INVENTOR,
William B. Sullivan
BY: Harry M. Saragovitz,
Edward J. Kelly & Herbert Berl
Attorneys.

SELECTIVE AUTOMATIC AUDIO THRESHOLD CIRCUIT

One such known system is the fixed threshold type which uses a fixed power level at the audio output terminals as the threshold point. Power in excess of this threshold, irrespective of origin, will cause the system to trigger. This system has no ability to adapt to environmental conditions. For example, in a jungle environment the general background noise increases by at least 10 db. at night because many of the animals and insects are nocturnal. At day or night, if an intruder appears in the area the noise level will drop since many of these creatures stop their calls in the presence of an intruder. The aforementioned system cannot adapt to the above conditions since the threshold thereof must be set above the worst case background noise and hence cause degradation of the system, that is, the distance at which a voice can be detected when the background noise is low.

Another known such system is the floating threshold type which uses the automatic gain control, AGC, in an audio amplifier to keep the output noise level constant and makes a binary decision by placing a threshold above this noise level. If the input level increases due to a voice or a fast increase of undesired audio energy, the output level of the audio frequency amplifier will rise since the attack time of the AGC is long. While the floating threshold type system has the capability of compensation for a variable background noise level, it has no ability to act on a specific signal-to-noise ratio nor can it ignore large impulse noise. In this system steady voice, over noise, is likely to be treated as noise and hence will not operate the system reliably. There is no control on the signal-plus-noise to noise ratio, hence the system can trigger on an audio signal which still does not have sufficient intelligent quality for transmission.

An object of the invention is a signal-plus-noise to noise system wherein a definite ratio must be maintained for a predetermined length of time to qualify the voice signal for transmission. This particular parameter ensures that, if the radio transmitter is keyed, the audio is of sufficient quality to allow intelligible reception. None of the previously described systems have this capability and, as a consequence, even if the previous approaches should trigger in the presence of voice, there is no implication that the audio is adequate to provide intelligible reception.

Another object of the invention is an automatic audio threshold system which triggers in response to periodic voice characteristics, that is to say, the audio input to said system must include voice characteristics. In regard to such characteristics, it is to be noted that in all languages the voice energy occurs in bursts which are random in nature but the probability distribution is over a narrow range.

Another object of the invention is a selective automatic audio threshold system for triggering a radio frequency transmitter which is immune from animal and insect calls and impulsive noise such as gun shots and the like.

The invention will be more fully understood from the following detailed description taken in conjunction with the drawings wherein like characters identify like elements and in which.

Figure 1:
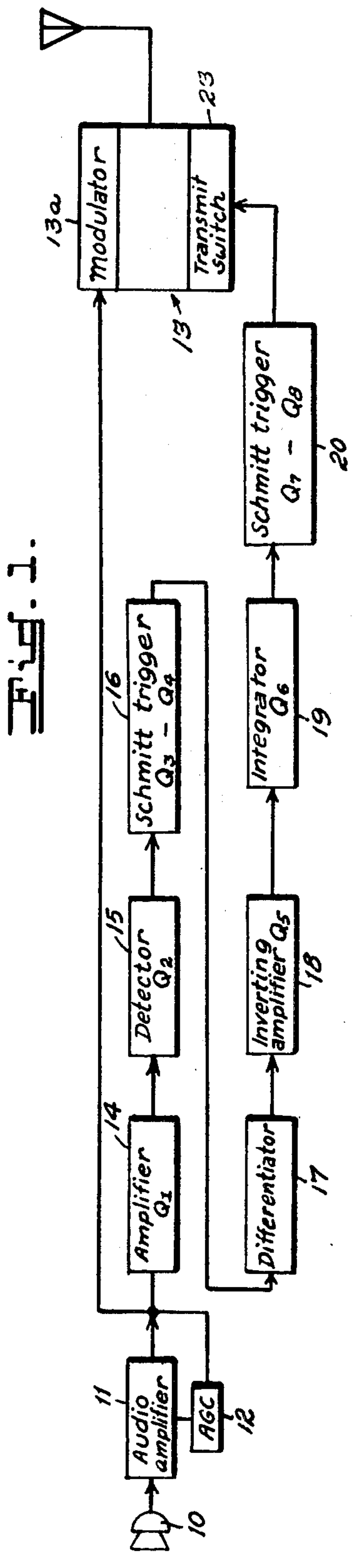
FIG. 1 is a block diagram illustrating the invention.
Figure 2:
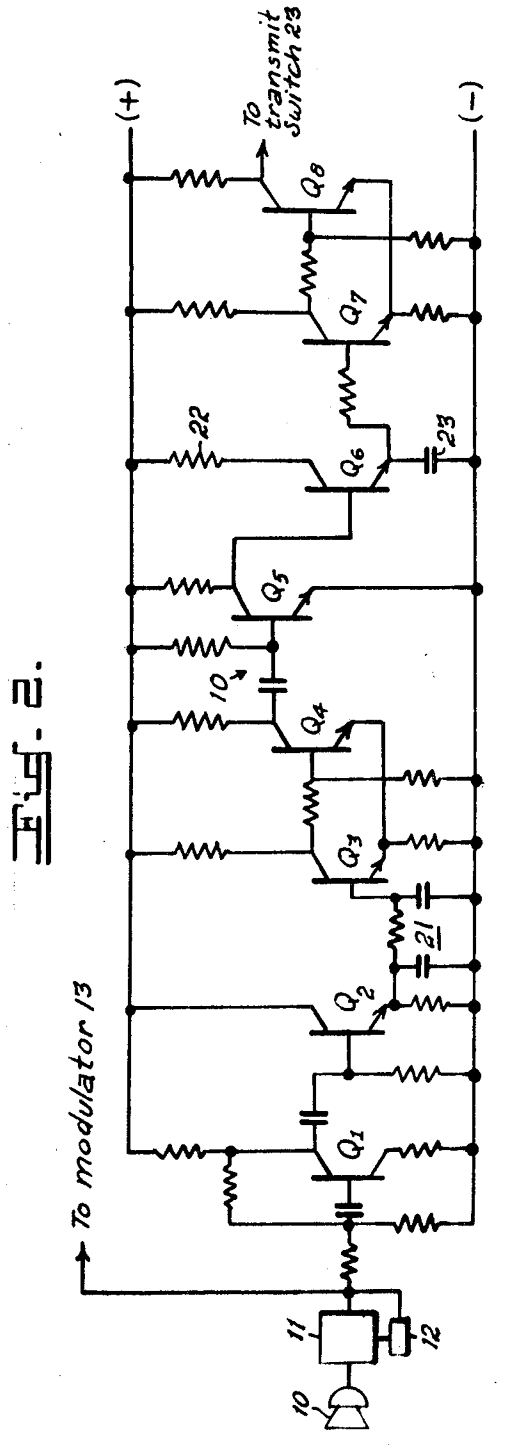
FIG. 2 is a schematic diagram of the invention.

Referring now to the drawings, a microphone 10 which is employed to convert the jungle noise and intruder voice into electrical energy has its output coupled to the input of an audio frequency amplifier 11 which is provided with an automatic gain control, AGC, means 12 whereby the noise level output of audio amplifier is held at a constant level. The output of amplifier 11 is coupled to the modulator 13*a* of a radiophone transmitter 13 and also to the input of amplifier 14, transistor $Q_1$, whose output is coupled to a detector 15, transistor $Q_2$, which in turn is coupled to Schmitt trigger 16, transistors $Q_3$–$Q_4$, the threshold of which is set for the desired signal-plus-noise to noise ratio. Reference numeral 17 indicates a differentiator coupled between the output of Schmitt trigger 16 and inverting amplifier 18, transistor $Q_5$, the output of which is applied to a Schmitt trigger 19, transistors $Q_7$–$2_8$, the threshold of which determines the sensitivity of the system to impulse noise. The trigger output of Schmitt trigger 20 is coupled to transmit switch 23 which in response to said trigger output turns the radiophone transmitter on for radiating signals containing the voice information.

When random background noise is received in microphone 10, it is amplified by audio amplifier 14. The AGC 12 is a peak-detecting type and holds the noise level at the output of amplifier 14 constant. Amplifier 14, is a low pass amplifier which isolates detector 15 from the audio to modulator 13*a* and emphasizes the low frequency voice components when available at the output of amplifier 11. Detector 15 is a peak-operating type which follows the envelope of noise energy. In the event of random noise, the detector 15 output is essentially DC with some random fluctuation. Detector 15 is followed by Schmitt trigger 16 the threshold of which is set to cause a trigger when the detector 15 voltage falls below half its normal value. This setting corresponds to a 6 db. signal-plus-noise to noise ratio. In the presence of random noise, Schmitt trigger 16 will always be in an ON state since the input voltage thereto is essentially constant. No further activity will be taken by the circuit unless a voice or impulse noise signal occurs. If the background noise changes the AGC 12 will reduce the audio amplifier 11 gain so that the input noise to the detector is constant.

In the event of impulse noise within the detection range of microphone, the AGC 12 will peak detect the impulse signal at the output of audio amplifier 11 and reduce the gain of audio amplifier 11. During the impulse no effect thereof is evident at the detector 15 input since, for a large impulse noise signal, transistor $Q_1$ of amplifier 14 will saturate. Following the impulse, however, audio amplifier 11 is desensitized until AGC 12 recovers. The noise level signal at the input to the detector 15 drops by the amount of AGC 12 action whereupon the detector 15 output level drops and Schmitt trigger 16, transistors $Q_3$–$Q_4$, goes to the OFF state. The output of Schmitt trigger 16 is differentiated by differentiator 17 which couples it to an inverting amplifier 18, $Q_5$. Since inverting amplifier 18 is normally saturated, the differentiated fall of the output of Schmitt trigger 16 at $Q_4$ appears as a pulse of constant width. The effect is that amplifier 18 will pass a pulse of width which is constant and independent of the time Schmitt trigger 16 is OFF. The pulse output from inverting amplifier 18 is integrated by integrator 19. Since integrator 19, $Q_6$, is current limited by collector resistor 22, the charge stored on capacitor 23 in the integrator is a function of pulse width only. As the pulse width is held constant by the differentiator action, one excursion to the OFF state by Schmitt trigger 16 corresponds to a unit step in voltage at the input to Schmitt trigger 20. Assume that microphone 10 is located in such a position that the voice plus noise amplitude is twice as great as the noise amplitude, audio amplifier 11 will "AGC" to provide a constant level of voice peaks, detector 15 will follow the envelope and if the 6 db. signal-plus-noise to noise criterion is met, Schmitt trigger 16 will go to an OFF state. Each time Schmitt trigger 16 goes off, integrator 19 will step up one increment of voltage. The third such step will cause Schmitt trigger 20 to go to the OFF state producing a trigger which causes radiophone transmitter to be turned on and the voice of the intruder to be so transmitted.

The operation of the instant system dependent on the thresholds of the Schmitt triggers. Changing the threshold of Schmitt trigger 16 sets the desired signal-plus-noise to noise ratio. Changing the threshold of Schmitt trigger 20 sets the system sensitivity to impulse noise by setting the number of impulses required within the time interval to turn radiophone transmitter on.

I claim:

1. An electronic system for controlling a radiophone transmitter whereby voice signals are transmitted in regard to a predetermined signal-plus-noise to noise ratio comprising in combination, a microphone positionable in a noise environment wherein random and periodic energy burst noise due to voice exist for detecting and converting such noise into electrical signals, an audio frequency amplifier provided with automatic gain control means having the input thereof coupled to said microphone and the output thereof coupled to the modulator of said radiophone transmitter and to a second audio frequency amplifier isolating a detector from said modulator, said audio frequency amplifier in response to electrical signals generated by the microphone in response to random noises producing a constant signal output through said second audio frequency amplifier to the input of said detector whereby said detector output voltage is maintained at its normal value and in response to periodic energy burst signal to apply through said second audio frequency amplifier a varying signal to the input of said detector whereby the output voltage thereof falls to half its normal value, a first Schmitt trigger having its input coupled to the output of said detector and responsive to the decrease in output voltage thereof to switch to the OFF state condition whereby a trigger voltage is produced at its output, a differentiator coupled between the output of said first Schmitt trigger and a normally saturated inverting amplifier whereby the output of said first Schmitt trigger is differentiated and fed to said inverting amplifier wherein differentiated fall of the output of said first Schmitt trigger appears at the output of said inverting amplifier as a pulse of constant width, and an integrator coupled between the output of said inverting amplifier and the input of a second Schmitt trigger whereby each said pulse of constant width is applied to the input of said second Schmitt trigger as a unit step voltage, said second Schmitt trigger having its output coupled to the transmit switch of the radiophone transmitter whereby when after a predetermined number of successive said unit step voltages are so applied to the input of the second Schmitt trigger it goes into an OFF state condition providing a trigger at the output thereof to said transmit switch whereby the radiophone transmitter is turned on.

2 The invention in accordance with claim 1 wherein said automatic gain control is a peak operating type which holds the noise level signal at the output of the audio frequency amplifier constant.

3. The invention in accordance with claim 2 wherein said detector is a peak operating type which follows the envelope of noise energy.